United States Patent
Tanaka

(10) Patent No.: US 7,028,113 B2
(45) Date of Patent: Apr. 11, 2006

(54) PC-CARD DATA COMMUNICATION APPARATUS

(75) Inventor: Toshiaki Tanaka, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 394 days.

(21) Appl. No.: 10/150,942

(22) Filed: May 21, 2002

(65) Prior Publication Data

US 2002/0178309 A1 Nov. 28, 2002

(30) Foreign Application Priority Data

May 22, 2001 (JP) ........................................ 2001-152572

(51) Int. Cl.
*G06F 13/12* (2006.01)

(52) U.S. Cl. ................... 710/62; 710/2; 710/8; 710/10

(58) Field of Classification Search ............ 710/2, 710/8, 10, 11, 62, 64
See application file for complete search history.

(56) References Cited

U.S. PATENT DOCUMENTS

| | | | | |
|---|---|---|---|---|
| 5,519,851 A | * | 5/1996 | Bender et al. | 395/500 |
| 5,812,827 A | * | 9/1998 | McGrath | 395/500 |
| 5,890,016 A | * | 3/1999 | Tso | 395/884 |
| 5,905,903 A | * | 5/1999 | Mizuta | 395/800 |
| 6,138,180 A | * | 10/2000 | Zegelin | |
| 2002/0152332 A1 | * | 10/2002 | Rensin et al. | 709/330 |

* cited by examiner

*Primary Examiner*—Jeffrey Gaffin
*Assistant Examiner*—Alan S Chen
(74) *Attorney, Agent, or Firm*—Varndell & Varndell, PLLC

(57) ABSTRACT

Enabled is operation, including confirmation of the data content of a PC card on a display screen or outputting the data onto an output unit, according to the operation of another terminal unit connected to a network. A module to be removably inserted by a PC card and an output unit for displaying and printing input data are connected through an interface. The module and a terminal unit are connected for data transmission and reception through a communicating unit for communicating data on a predetermined communication protocol. By inserting the PC card in the module, the data of the PC card is converted into a data form to be data-processed on the output unit and into a data form suited for a communication protocol of the communicating unit.

12 Claims, 4 Drawing Sheets

PC-CARD DATA COMMUNICATION APPARATUS

BACKGROUND OF THE INVENTION

1. Technical Field of the Invention

This invention relates to an apparatus for extending the function of an output unit, such as a printer or a CRT, by the use of a PC card.

2. Description of the Related Art

Due to the recent spread of networks, there is a demand for connecting an output unit, such as a printer or a CRT, by a LAN (Local Area Network) or the Internet to function the output unit as a terminal unit on the network.

Contrary to this, the output unit is usually not provided with a function of network communication, modem or the like because of use for a particular purpose of application. For this reason, the functional extension of the output unit must be made by the use of a function-extending device of a PC card of a PCMCIA (Personal Computer Memory Card International Association) standard (PCMCIA card).

However, such an output unit is not mounted with a PCMCIA-standard slot. Thus, it is impossible to directly insert a PC card.

In order to extend the function of the output unit by using a PC card, there is a necessity to connect between an input/output port of the output unit and an input/output port of the personal computer through a connection cable and conversion connector, thereby inserting a PC card in a slot of the personal computer.

By thus connecting between the output unit and the personal computer, the data of the PC card can be confirmed in contents on a display screen and outputted onto the output unit by the operation on the personal-computer end.

Herein, there is a demand for the operation to confirm the data content of a PC card on a display screen or to output data onto the output unit depending upon the operation on another terminal unit (personal computer, workstation, portable terminal unit or the like) connected to a network instead of a personal computer directly connected to the output unit.

Therefore, it is an object of the present invention to enable an operation, such as confirmation of the data content of a PC card on a display screen or outputting data onto an output unit, depending upon the operation of another terminal unit connected to a network.

SUMMARY OF THE INVENTION

The present invention is characterized by comprising:

a module to be removably inserted by a PC card and an output unit for displaying or printing input data being connected through an interface;

the module and a terminal unit being connected for data transmission and reception through a communicating unit for communicating data on a predetermined communication protocol; and a converting unit for converting data of the PC card into a data form to be data-processed on the output unit and into a data form suited for a communication protocol of the communicating unit by inserting a PC card in the module.

According to the present invention, a module 30 to be removably inserted by a PC card 40, 41 and an output unit 10 for displaying and printing input data are connected through an interface 20 as shown in FIG. 1. The module 30 and a terminal unit 60 are connected for data transmission and reception through a communicating unit 70 for communicating data on a predetermined communication protocol. By inserting the PC card 40, 41 in the module 30, the data of the PC card 40, 41 is converted into a data form to be data-processed on the output unit 10 and into a data form suited for a communication protocol of the communicating unit 70.

According to the invention, by inserting a PC card 40, 41 in the module 30, the data of the PC card 40, 41 is converted into a data form to be data-processed on the output unit 10 and into a data form suited for a communication protocol of the communicating unit 70. Consequently, depending upon the operation of another terminal unit 60 connected to the communicating unit 70, it is possible to confirm the data content of the PC card 40, 41 on the display screen 61 or output data onto the output unit 10.

BRIEF DESCRIPTION OF THE DRAWINGS

FIG. 4A is a conceptual view of a software to be installed onto the adaptor module, while

DETAILED DESCRIPTION OF THE INVENTION

Now, explanation will be made on an embodiment with reference to the drawings.

Figure 1:
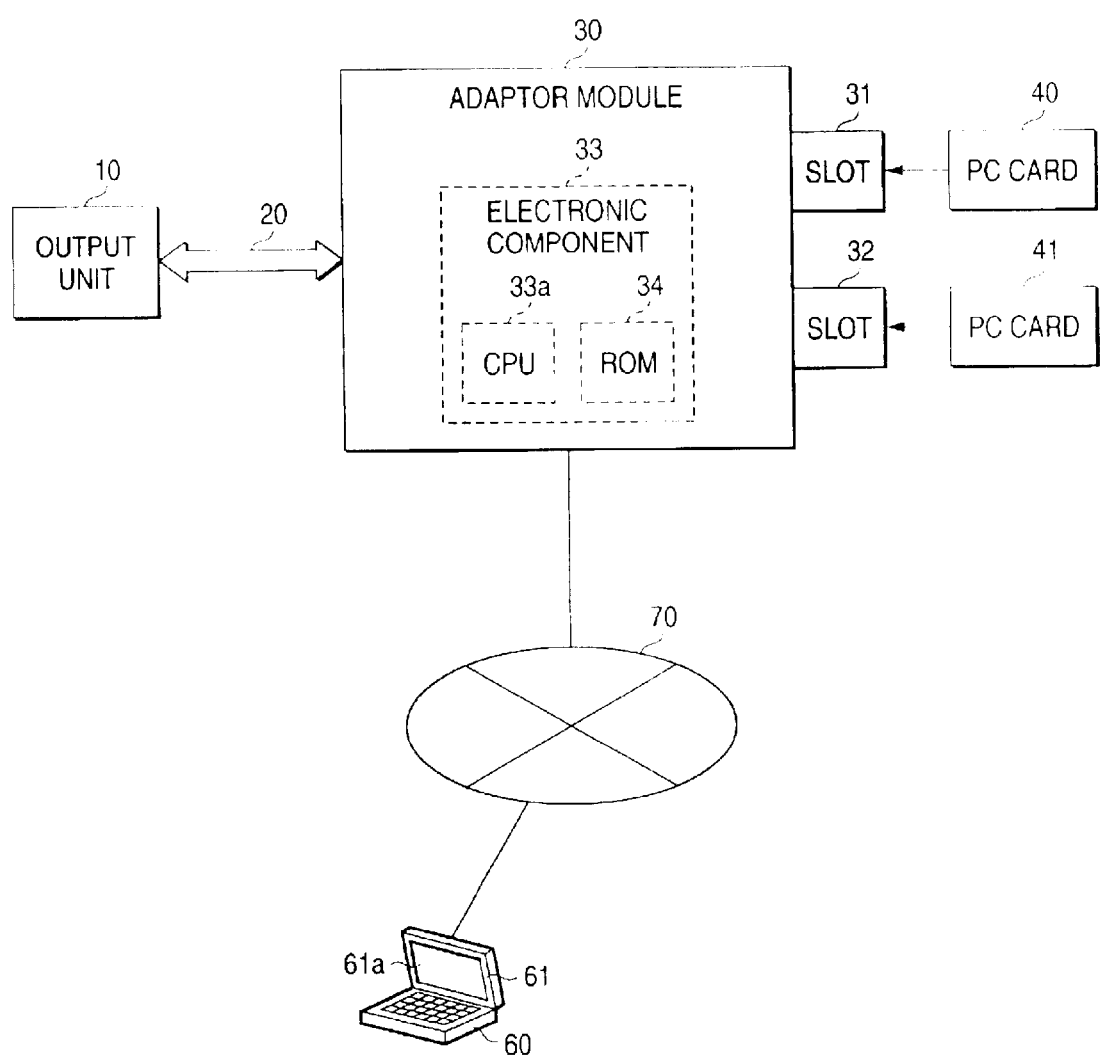
FIG. 1 is a view showing an apparatus structure of an embodiment.

FIG. 1 shows an apparatus configuration of an embodiment. Incidentally, in the embodiment, an output unit 10 is assumably a unit for print or display, such as a printer or a CRT.

As shown in FIG. 1, an adaptor module 30 has a general-purpose or particular extension interface 20 to be connected to the output unit 10.

The adaptor module 30 has slots 31, 32 in which two PC cards 40, 41 can be inserted. Consequently, two PC cards 40, 41 can be removably inserted in the adaptor module 30.

In this embodiment, there is a need to transmit the data stored on the PC card through a wire or wirelessly. Accordingly, the PC cards 40, 41 are a memory card 40 and a transmission-functioning PC card 41, such as a network card.

The adapter module 30 and the terminal unit 60 are connected together for mutual communication through a communicating unit 70. The communicating unit 70 is, for example, the Internet, Intranet, LAN (local area network) or the like, including any communicating means for communication through a wire or wirelessly.

In the embodiment, it is assumed that the communicating unit 70 is the Internet. On the Internet, services are offered including WWW (worldwide web: information search system over the Internet).

On the Internet as a communicating unit 70, data are transmitted and received according to a predetermined communication protocol (TCP/IP). The adaptor module 30 converts the data of the memory card 40 according to an HTTP (Hyper text transfer protocol), in order to provide WWW services.

Furthermore, the adaptor module 30 processes the data stored on the memory card 40 into an HTML (Hyper text markup language) formed file or image file, thus providing a form to be displayed on a Web browser.

The terminal unit 60 has a display 61. The terminal unit 60 is installed with a Web browser as data display software. Accordingly, on a display screen 61a of the display 61 of the terminal unit 60, a Web page as an HTML file or image file transmitted according to the HTTP is to be displayed.

The terminal unit 60 is a personal computer, workstation, portable terminal unit or the like.

The adaptor module 30 is built with various electronic components 33 minimally required to control the input/output of data between the inserted PC card 40, 41 and the output unit 10 and to control the communications between the PC card 40, 41 and the terminal unit 60. Consequently, the electronic components 33 built in the adaptor module 30 are less in the number than the electronic components incorporated in the conventional personal computer. The electronic components 33 include a CPU 33a and a ROM 34. The ROM 34 has therein a software to process the input/output of data between the inserted PC card 40, 41 and the output unit 10 and to process data communication between the PC card 40, 41 and the terminal unit 60.

Namely, by inserting the memory card 40 and communication function card 41 onto the adaptor module 30, the data stored in the memory card 40 can be converted into a data form to be displayed or printed on the output unit 10 or into a data form suited for a communication protocol of the communicating unit 70.

In this case, the following schemes are available in outputting the data content stored in the memory card 40 onto the output unit 10.

First Scheme

By inserting the memory card 40 in the adaptor module 30, the storage data of the memory card 40 can be converted into a data form to be printed or displayed on the output unit 10, thus being outputted onto the output unit 10. Due to this, the storage data of the memory card 40 is displayed or printed on the output unit 10. Meanwhile, in the adaptor module 30, the storage data of the memory card 40 is converted into a data form suited for a communication protocol of the communicating unit 70. By starting up a Web browser on the terminal unit 60, the storage data of the memory card 40 is transmitted to the terminal unit 60 according to the predetermined communication protocol by the communicating unit 70. On the terminal unit 60, the storage data of the memory card 40 is displayed on the display screen 61a through the Web browser. Accordingly, it is possible to confirm, on the terminal unit 60, a content of the storage data of the memory card 40 inserted in the adaptor module 30.

Second Scheme

By inserting the memory card 40 in the adapter module 30, the storage data of the memory card 40 can be converted into a data form to be displayed or printed on the output unit 10. Also, in the adaptor module 30, the storage data of the memory card 40 is converted into a data form suited for a communication protocol of the communicating unit 70. When a Web browser is started up on the terminal unit 60, the storage data of the memory card 40 is transmitted to the terminal unit 60 according to a predetermined communication protocol by the communicating unit 70. On the terminal unit 60, the storage data of the memory card 40 is displayed on the display screen 61a through the Web browser. The image data in plurality stored in the memory card 40, for example, is all displayed on the display screen 61a. Consequently, the image data in plurality is confirmed in its content on the display screen 61a, to select from them the data to be outputted to the output unit 10. By the selecting operation, the data representative of a selection result is transmitted to the adaptor module 30 through the communicating unit 70.

In the adaptor module 30, the image data corresponding to the selection result is extracted from the storage data of the communication function card 41. Then, the image data dependent upon the selection result is outputted onto the output unit 10. Due to this, of the storage data of the memory card 40 the data selected on the terminal unit 60 (e.g. image data) only is displayed or printed on the output unit 10.

Figure 2:
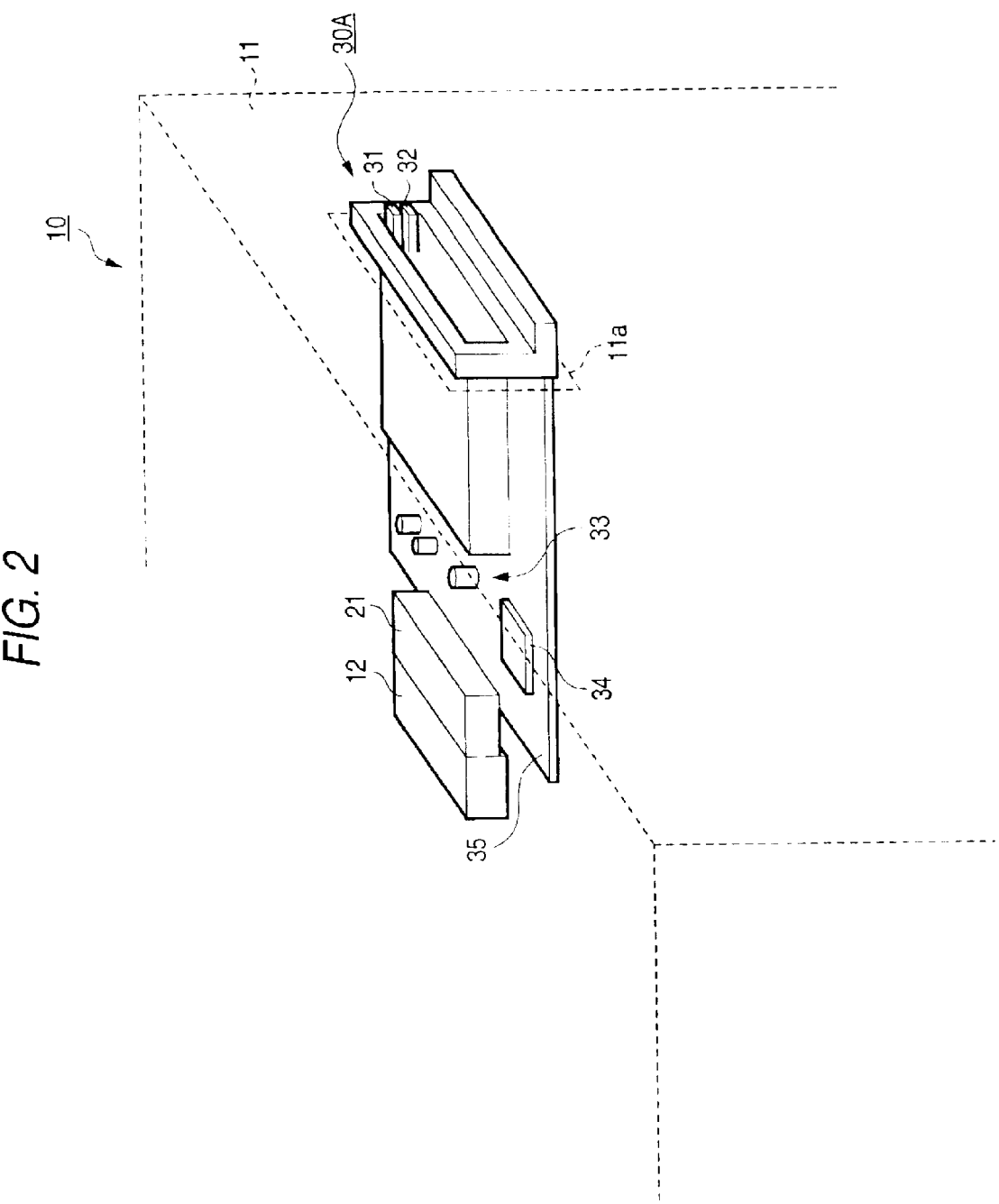
FIG. 2 is a perspective view showing a first structural example of an adaptor module.

FIG. 2 shows, in a perspective view, a detailed first structural example of the adaptor module 30 of FIG. 1.

As shown in FIG. 2, the adaptor module 30A is structured by arranging, on the board 35, various electronic components 33 including a ROM 34, an input/output port 21 and slots 31, 32.

The input/output port 21 is formed in a form for direct connection to the input/output port (I/O port) 12 of the output unit 10. Namely, the input/output port 21 is formed with the ports in the number, shape, position in compliance with an interface standard of the output unit 10.

The adaptor module 30A is formed in a shape and size to be incorporated within a housing 11 of the output unit 10 leaving the insertion hole of the slots 31, 32. When the adapter module 30A is incorporated in the housing 11 of the output unit 10, connection is made between the input/output port 21 of the adaptor module 30A and the input/output port 12 of the output unit 10. Thus, the slots 31, 32 of the adaptor module 30A, at the insertion holes, are positioned in an aperture 11a of the housing 11.

According to the first structural example shown in FIG. 2, the adaptor module 30A is structured by arranging, on the board 35, minimally required components, such as the various electronic components 33, the input/output ports 21 and the slots 31, 32. This, accordingly, can reduce the number of parts and hence cost as compared to the conventional case using a personal computer.

Also, the first structural example shown in FIG. 2, because of forming the input/output port 21 in compliance with the interface standard of the output unit 10, can be connected to the output unit 10 without the use of a conversion connector.

Also, according to the first structural example shown in FIG. 2, the adaptor module 30A is incorporated within the housing 11 of the output unit 10. This eliminates the necessity of a site for providing a personal computer or a site for laying connection cables as compared to the conventional art, reducing the area of site. Accordingly, the first structural example can easily carry out functional extension of the output unit 10.

Figure 3:
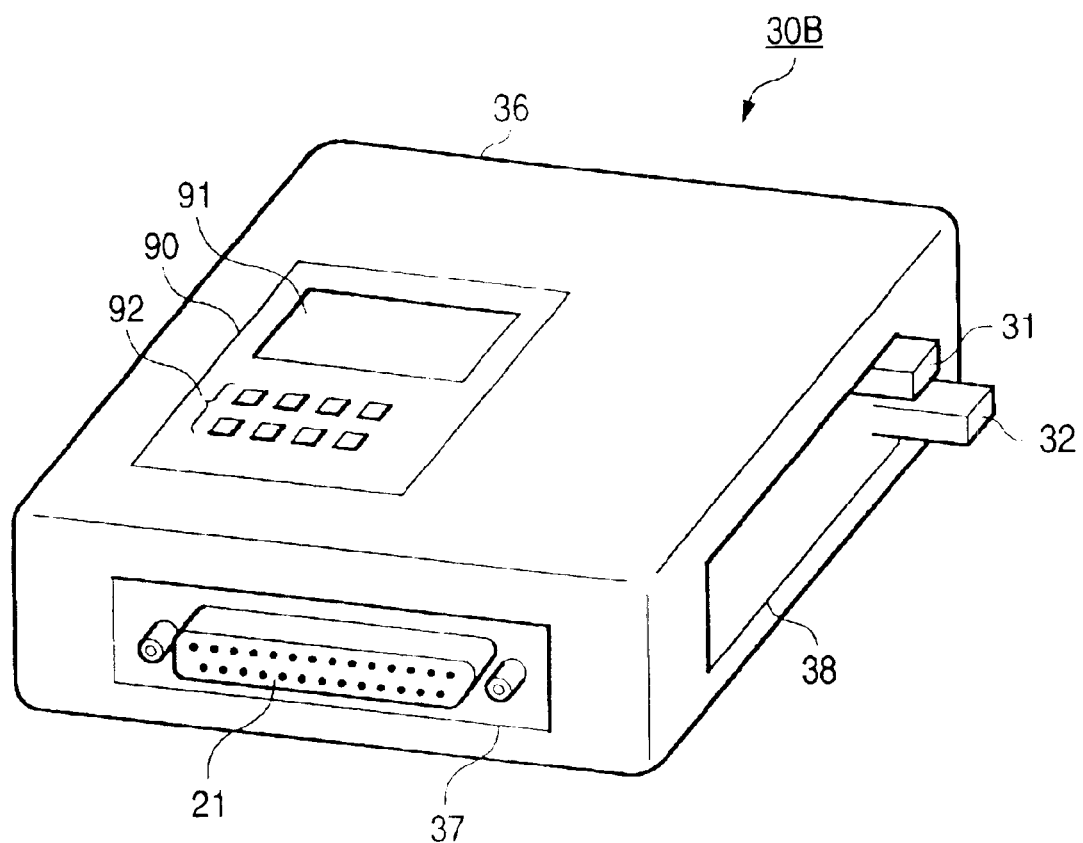
FIG. 3 is a perspective view showing a second structural example of an adaptor module.

FIG. 3 shows, in a perspective view, a detailed second structural example of the adaptor module 30 of FIG. 1.

As shown in FIG. 3, the adaptor module 30B is structured as a housing 36. The housing 36 incorporates therein a module arranging, on a board 35, various electronic components 33 including a ROM 34, an input/output port 21' and slots 31, 32, similarly to the first structural example of FIG. 2. The housing 36 is formed with apertures 37, 38 to expose the input/output port 21' and the insertion hole of the slot 31, 32 to the outside.

Meanwhile, an operation panel 90 is provided in an outer wall of the housing 36. The operation panel 90 is structured with a display area 91 formed by a display screen and an operation area 92 formed by a group of switches. The operation panel 90 is provided to confirm the data stored in a memory card 40 and select data to be outputted onto the output unit 10.

The input/output port 21' and the input/output port of the output unit 10 are connected together through a cable. The input/output port 21' may be an input/output port suited for an interface standard of the output unit 10, similarly to the first structural example of FIG. 2, or may be an input/output port of a general-purpose interface. In the case that the input/output 21' is structured as a general-purpose interface, it is connected to the input/output port of the output unit 10 through a conversion connector 5.

The apparatus of the second structural example operates on the following scheme.

Third Scheme

By inserting a memory card 40 on the adaptor module 30B, the storage data of the memory card 40 can be converted into a data form to be displayed or printed on the output unit 10. Then, the storage data of the memory card 40 is displayed on a display area 91 of the operation panel 90. On the display area 91, the image data stored in the memory card 40, for example, is all displayed. The content of the image data in plurality is confirmed on the display area 91, to select from them the data to be outputted to the output unit 10 by the operation area 92. When the selecting operation is made, in the adaptor module 30, the image data corresponding to the selection result is extracted from the storage data of the communication function card 41. Then, the image data according to the selection result is outputted onto the output unit 10. Due to this, of the storage data of the memory card 40 the data selected on the operation area 92 of the operation panel 90 (e.g. image data) only is displayed or printed on the output unit 10.

According to the second structural example shown in FIG. 3, the adaptor module 30B is structured by arranging, within the housing 36, minimally required components similarly to the first structural example of FIG. 2. This, accordingly, can reduce the number of parts and hence cost as compared to the conventional case using a personal computer. Also, the adaptor module 30B can be made compact and hence the area of site can be reduced as compared to the conventional case using a personal computer Now, explanation is made on a software to be incorporated on the ROM 34 of the adaptor module 30 (30A, 30B), by using FIG. 4.

Figure 4A:
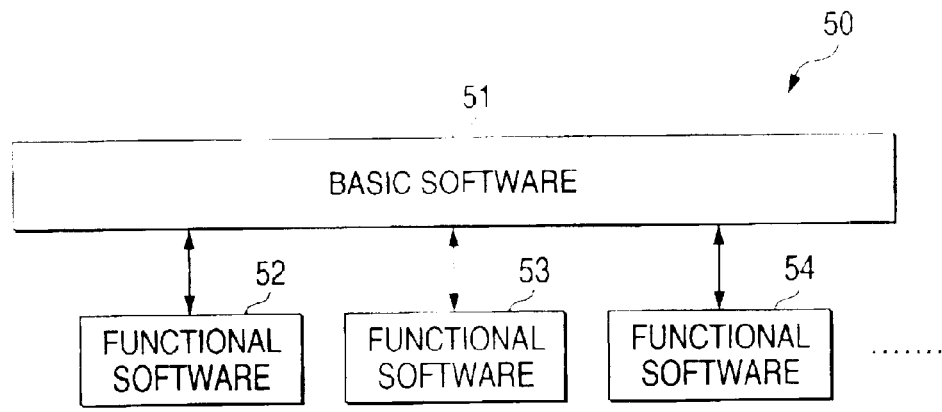

FIG. 4A conceptually shows a software 50 to be incorporated on the ROM 34.

Namely, the software 50 is configured with a basic software 51 for executing a process common to PC card having plural functions and functional software 52, 53, 54 . . . for executing a process according to the function of each PC card, thus architecting a firmware.

The basic software 51 refers to an ADK (Application Developer Kit) or SDK (Software Developer Kit).

Figure 4B:
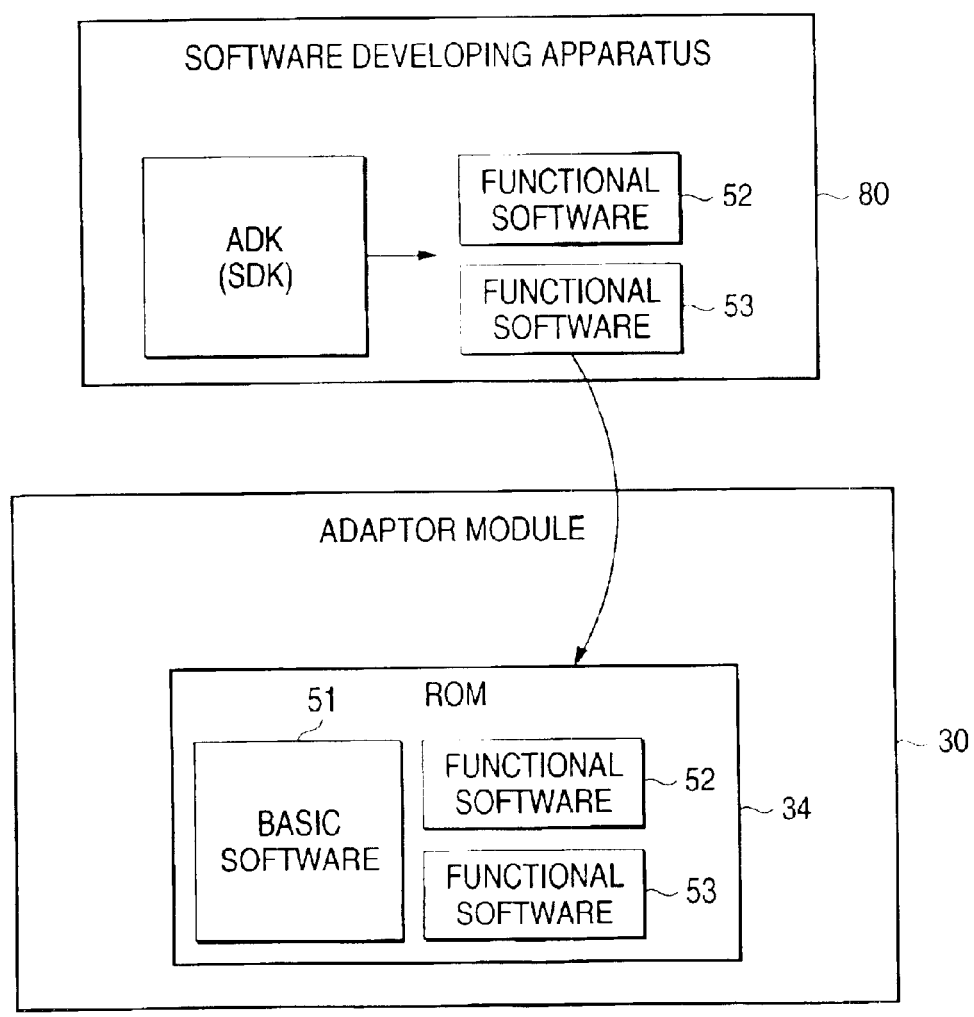
FIG. 4B is a view conceptually showing a procedure for incorporating a software on a ROM.

FIG. 4B conceptually shows a procedure of up to an incorporation of a software 50.

After the extension functions required by the output unit 10 are defined, functional software 52, 53 is prepared for each required function in compliance with a required specification by a software developing apparatus (e.g. personal computer) 80 with using an ADK or SDK. In this case, because of using the ADK or SDK, there is no need to newly prepare the portion corresponding to the basic software 51. It is possible to carry out software developing operation swiftly and easily.

The functional software 52, 53 thus prepared is combined with the basic software 51 thereby architecting a firmware 50 to be incorporated on the ROM 34.

Incidentally, the above embodiment had the two slots 31, 32 in the adaptor module 30 to insert two PC cards therein, three or more slots may be provided in the adaptor module 30 to allow insertion of three or more PC cards.

Meanwhile, the explained embodiment explained on the adaptor module 30 as that different from a general-purpose computer. However, the invention is also applicable to the case using a general-purpose computer in place of the adaptor module 30.

What is claimed is:

1. A PC-card data communication apparatus comprising:

an output unit including a CRT display;

an adaptor module that extends the functionality of the output unit so that the output unit may function in a computer networking system as a network terminal unit, the module to be removably inserted by a PC card and being connected with the output unit through an interface;

a terminal unit being connected with the module for data transmission and reception through a communicating unit for communicating data on a predetermined communication protocol; and a converting unit for converting data of the PC card into a first data form to be data-processed on the output unit and into a second data form suited for a communication protocol of the communicating unit, by inserting a PC card in the module.

2. The apparatus according to claim 1, wherein the communicating unit is a computer networking system.

3. The apparatus according to claim 1, wherein the adaptor module is included within a housing of the output unit.

4. The apparatus according to claim 1, wherein the adaptor module includes a housing with an integral operation panel including a visual display and one or more switches.

5. A PC-card data communication apparatus comprising:

an output unit including a printer;

an adaptor module that extends the functionality of the output unit so that the output unit may function in a computer networking system as a network terminal unit, the module to be removably inserted by a PC card and being connected with the output unit through an interface;

a terminal unit being connected with the module for data transmission and reception through a communicating unit for communicating data on a predetermined communication protocol; and a converting unit for converting data of the PC card into a first data form to be data-processed on the output unit and into a second data form suited for a communication protocol of the communicating unit, by inserting a PC card in the module.

6. The apparatus according to claim 5, wherein the communicating unit is a computer networking system.

7. The apparatus according to claim 5, wherein the adaptor module is included within a housing of the output unit.

8. The apparatus according to claim 5, wherein the adaptor module includes a housing with an integral operation panel including a visual display and one or more switches.

9. An output device adaptor apparatus comprising:

an adaptor module that extends the functionality of an output device so that the output device may output data stored in a removably inserted memory card and function in a computer networking system as a first network terminal unit, the adaptor module is coupled to the output device and the computer networking system and operates such that a second network terminal coupled to the computer networking system may control and operate information to the output device with input data sent by the second network terminal to the adaptor module, without use of an intervening PC;

the adaptor module including a first communication port for communicatively coupling to said output unit, a second communication port for communicatively coupling to the computer networking system, a third communication port for communicatively coupling to a memory card, and a fourth communication port for communicatively coupling to a communication function card.

10. The apparatus according to claim 9, wherein the memory card is a PCMCIA card and the communication card is a PCMCIA card.

11. A communication system comprising:

a stand-alone output device for displaying or printing input data;

an adaptor module communicatively coupled to the output device through a first communication port, the adaptor module extends the functionality of the output unit so that the output unit may function as a network terminal;

a communication network communicatively coupled to the adaptor module for communication with other devices;

a terminal device communicatively coupled to the communication network for data transmission and reception via the communication network;

a memory card removably coupled to the adaptor module, the memory card containing data stored in memory for transmission to the terminal device and the output device;

a transmission functioning card removably coupled to the adaptor module for managing communications with the communication network using a predetermined communication protocol defined by the transmission functioning card; and a converting unit, included in the adaptor module, for converting the data of the memory card into a first data form to be data-processed on the output device and into a second data form suited for the communication protocol of the communication network.

12. The apparatus according to claim 11, wherein the communication network is a LAN, Internet, or Intranet.

* * * * *